United States Patent [19]
Altemus et al.
[11] 3,710,011
[45] Jan. 9, 1973

[54] SYSTEM FOR AUTOMATICALLY PRODUCING A COLOR DISPLAY OF A SCENE FROM A BLACK AND WHITE REPRESENTATION OF THE SCENE

[75] Inventors: William C. Altemus; James Duca, both of Littleton, Colo.

[73] Assignee: Computer Image Corporation, Denver, Colo.

[22] Filed: Dec. 4, 1970

[21] Appl. No.: 95,096

[52] U.S. Cl. ............................178/5.4 R, 178/5.2 R
[51] Int. Cl. ..............................................H04n 9/12
[58] Field of Search.........................178/5.2, 5.4, 6.8

[56] References Cited

UNITED STATES PATENTS 2,593,925 4/1952 Sheldon...............................178/6.8

*Primary Examiner*—Richard Murray
*Attorney*—Rogers, Ezell, Eilers & Robbins

[57] ABSTRACT

This invention comprises a system for producing a color representation on either video tape or a color display device of a static or dynamic scene, each color being independently selective and variable. Signals are generated for representing the scene in discrete shades of gray, which signals are used to generate further signals representing the red, green and blue components of a color assigned to each gray shade. These red, green and blue component signals are used to produce the color representation. The system further includes means for selecting the colors assigned to the various gray shades, and exclusive logic means allowing independent selection and variation of each color. Means are also provided for animating the scene to produce a fully animated color representation.

37 Claims, 14 Drawing Figures

INVENTORS
WILLIAM C. ALTEMUS
JAMES DUCA
BY
Rogers, Ezell, Eilers + Robbins
ATTORNEYS INVENTORS
WILLIAM C. ALTEMUS
JAMES DUCA
BY Rogers, Ezell, Eilers & Robbins
ATTORNEYS

| OUTPUT | ACTIVE ONLY WHEN | INPUT CONDITION |
|---|---|---|
| 302 | | $E_4 < E_V$ |
| 303 | | $E_2 < E_V < E_4$ OR $E_6 < E_V$ |
| 304 | | $E_1 < E_V < E_2$ OR $E_3 < E_V < E_4$ OR $E_5 < E_V < E_6$ OR $E_7 < E_V$ |

INVENTORS
WILLIAM C. ALTEMUS
JAMES DUCA
BY Rogers, Ezell, Eilers & Robbins
ATTORNEYS

| OUTPUT | ACTIVE ONLY WHEN | INPUT CONDITION |
|---|---|---|
| $C_5$ | | $E_4 < E_V$ |
| $C_4$ | | $E_3 < E_V < E_4$ |
| $C_3$ | | $E_2 < E_V < E_3$ |
| $C_2$ | | $E_1 < E_V < E_2$ |
| $C_1$ | | $E_V < E_1$ |

INVENTORS
WILLIAM C. ALTEMUS
JAMES DUCA
BY Rogers, Ezell, Eilers & Robbins
ATTORNEYS

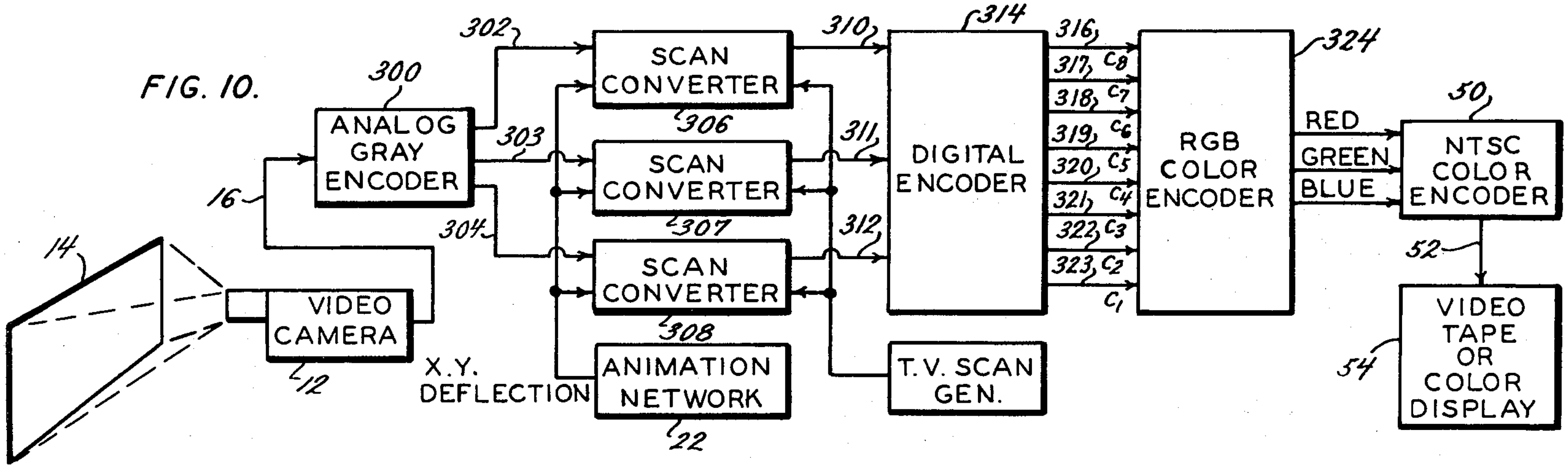

FIG. 10.

| OUTPUT | ACTIVE ONLY WHEN | INPUT CONDITION FROM SCAN CONVERTERS | INPUT CONDITION FROM VIDEO CAMERA 12 |
|---|---|---|---|
| $C_8$ | | 306, 307 & 308 ACTIVE | $E_7 < E_V$ |
| $C_7$ | | 306 & 307 ACTIVE<br>308 NOT ACTIVE | $E_6 < E_V < E_7$ |
| $C_6$ | | 306 & 308 ACTIVE<br>307 NOT ACTIVE | $E_5 < E_V < E_6$ |
| $C_5$ | | 306 ACTIVE<br>307 & 308 NOT ACTIVE | $E_4 < E_V < E_5$ |
| $C_4$ | | 307 & 308 ACTIVE<br>306 NOT ACTIVE | $E_3 < E_V < E_4$ |
| $C_3$ | | 307 ACTIVE<br>306 & 308 NOT ACTIVE | $E_2 < E_V < E_3$ |
| $C_2$ | | 308 ACTIVE<br>306 & 307 NOT ACTIVE | $E_1 < E_V < E_2$ |
| $C_1$ | | 306, 307 & 308 NOT ACTIVE | $E_V < E_1$ |

FIG. 14.

INVENTORS
WILLIAM C. ALTEMUS
JAMES DUCA
BY
Rogers, Ezell, Eilers & Robbins
ATTORNEYS

SYSTEM FOR AUTOMATICALLY PRODUCING A COLOR DISPLAY OF A SCENE FROM A BLACK AND WHITE REPRESENTATION OF THE SCENE

BACKGROUND OF THE INVENTION

In certain applications it has been found that standard television techniques cannot be used to produce a color television display or video tape color representation of a scene photographed with a video camera. For example, such techniques cannot be used where the scene is in black and white, or where the scene is animated by distorting the raster on which the picture is generated. In the latter case, the red, green and blue electron guns of the color display device are made to scan in some irregular pattern as dictated by the animation network. Once the electron guns of the standard color television display device are made to scan in a pattern other than the standard raster pattern, there is no assurance that the guns will converge on the appropriate color spots, resulting in a conglomeration of randomly mixed colors.

A system is therefore desirable for generating a color display of a static or dynamic scene where the scene is in black and white, and/or is animated in any one of a variety of animation sequences, such as those disclosed in Lee Harrison III et al. patent application Ser. No. 882,125, entitled Computer Animation Generating System, dated Dec. 4, 1969. This invention is such a system.

SUMMARY OF THE INVENTION

In two embodiments of this invention the scene to be displayed is photographed by a first video camera. The scene can be of any form, static or dynamic, as for example, a piece of art work. The video output from the first video camera corresponding to a black and white representation of the scene is fed into an analog gray encoded which produces output signals representing the scene in discrete shades of gray. The scene may also be animated in accordance with the system disclosed in the above referenced co-pending application to produce an animated scene in discrete shades of gray.

The animated scene is converted to a standard raster scan to produce video output signals which are fed into a digital gray encoder. From the output of the digital encoder, exclusive signals are generated to represent each gray shade. In response to the exclusive signals, red, green and blue color component signals are generated to define a color assigned to each gray shade. The red, green and blue component signals are fed into a standard NTSC color encoder, the output of which is used to produce the video tape color representation or color display. It should be noted that in these embodiments the scan conversion is accomplished before the selection of color signals.

In another embodiment the scan conversion is accomplished after the selection of color signals.

A video camera photographs the scene to produce video output signals representing the scene in black and white. These video output signals are fed into a digital gray encoder for producing signals representing the scene in discrete shades of gray. In response to the signals from the digital gray encoder, red, green and blue color component signals are generated to produce each color assigned to each gray shade, which signals are each fed into scan conversion means, together with animation signals generated in accordance with the above-referenced co-pending application, to produce an animated representation of the scene in each of the red, green and blue color components. The scan conversion means converts the animated scan to a standard raster scan to produce red, green and blue color component signals in standard raster sequence. These signals are fed into an NTSC color encoder, the output of which is used to generate the video tape color representation or the color display.

With either of these embodiments any color can be assigned to each gray shade representing a portion of the photographed scene.

DESCRIPTION OF THE DRAWING

FIG. 10 is a general block diagram of the system of another embodiment of this invention;

FIG. 14 is a chart used in explaining the operation of the networks of FIGS. 11 and 13, showing the input conditions under which each of the outputs is activated.

DETAILED DESCRIPTION OF PREFERRED EMBODIMENTS

Figure 1:
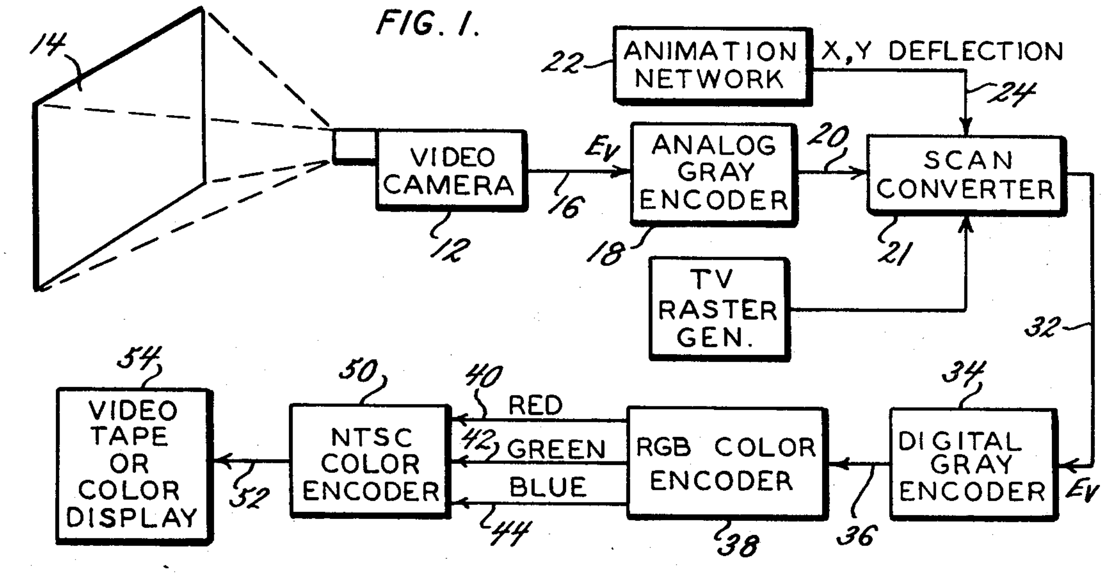
FIG. 1 is a general block diagram of the system of one embodiment of this invention.

In FIG. 1 there is shown a general block diagram of one embodiment of the invention. A black and white video camera 12 photographs scenes such as a piece of artwork 14 which may be in either color or black and white. The term "black and white" is used herein, as it is used in the television industry to mean monochrome and includes the infinitely many shades of gray therebetween. The video output $E_V$ from the camera 12 is fed through a conductor 16 to the input of an analog gray encoder 18. The analog gray encoder 18, which will be hereinafter described in detail, transforms the video signal at its input, which may represent many shades of gray ranging from black to white, depending on the artwork 14, to a signal representing the select number of discrete shades of gray. In this embodiment the output of the analog gray encoder 18 represents a total of five discrete shades of gray, although fewer or greater shades could be represented. The output from the analog gray encoder 18 is fed through a conductor 20, to the video input of a scan converter 21.

Animation output signals from an animation network 22, of the type fully disclosed in the above-referenced co-pending patent application which basically is a system for automatically producing an animated display of a scene, such as the artwork 14, the animation being in any of a great variety of sequences and forms, are fed through suitable conductors 24 to the X,Y deflection inputs of the scan converter 21.

If it were not for the animation signals from the animation network 22, the scan converter 21 would not be necessary. But, because much of the animation is produced by distorting the raster patterns scanned by the camera 12, and because the standard color display device requires a standard raster scan, the scan converter 21 is required to produce the animated scene on a standard raster for ultimate production of the color display.

Figures 2, 3, 9:
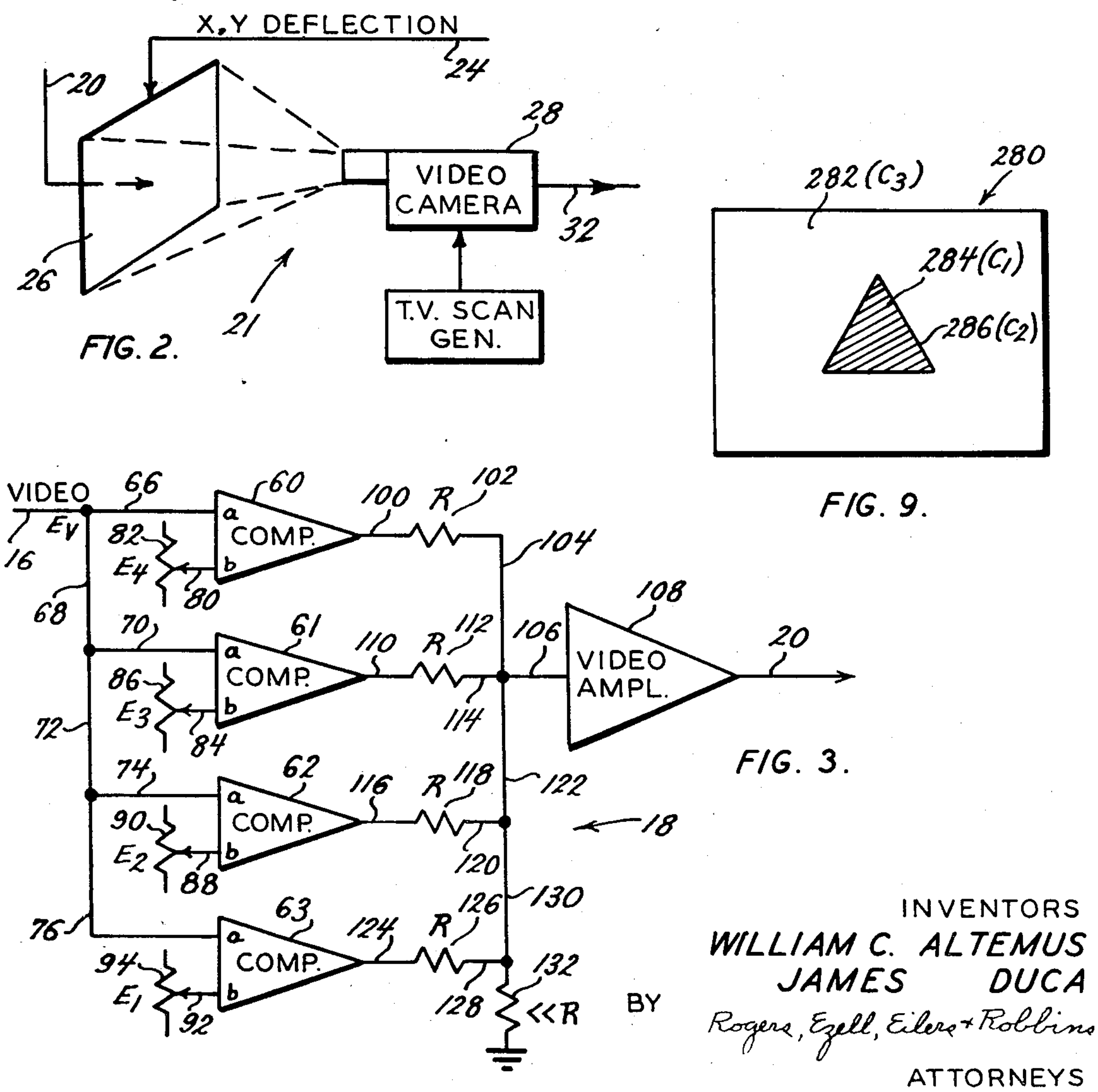
FIG. 2 is a schematic drawing of one type of scan converter used with this invention.
FIG. 3 is a schematic drawing of the analog gray encoder of this invention.
FIG. 9 is a drawing of a scene used in explaining some of the operations of this invention.

The scan converter 21 can be of any suitable type for converting an animated scan to a standard raster scan. In FIG. 2 there is shown one type of scan converter having a display device 26, such as a CRT, and a video camera 28. The analog gray encoder 18 and animation network 22 output signals are fed to the CRT 26 to produce on the CRT 26 an animated display of the artwork 14 in discrete shades of gray as defined by the analog gray encoder 18. The video camera 28 photographs the display 26 to produce video output signals $E_V$ representing the animated display in standard raster sequence.

In another type of scan converter an electrical storage device such as a vidicon tube with electrical write-in and read-out modes, is used to make the conversion. During the write-in mode, the scan converter scans in an animated pattern dictated by the signals from the animation network 22 as it stores information dictated by the signals at its video input. After completing the animation scan, it goes into the readout mode wherein it is made to scan in a standard raster pattern producing signals at its output representing the stored information in standard raster sequence.

The video output $E_V$ from the scan converter 21 is fed through a conductor 32 to the input of a digital gray encoder 34 which further defines discrete shades of gray. Like the analog gray encoder 18, the digital gray encoder 34 of this embodiment of the invention defines five discrete shades of gray, although fewer or greater shades could be defined. The outputs from the digital gray encoder 34 are fed through suitable conductors 36 to the inputs of an RGB color encoder 38 having three outputs 40, 42 and 44. The RGB color encoder 38 assigns a color as represented by voltages produced at the outputs 40, 42 and 44 to each discrete gray shade as defined by the signals from the outputs of the digital gray encoder 34. The voltage at the output 40 represents the red color component of each assigned color; the voltage at the output 42 represents the green color component of each assigned color; and the voltage at the output 44 represents the blue color component of each assigned color. The red, green and blue component voltages, together representing the assigned color for each discrete shade of gray, are fed into an NTSC color encoder 50 of a type commonly known in the art, the output of which is fed through a conductor 52 to a video tape or color display device 54 for producing a color display. The color display on the display device 54 consists of five colors, one for each discrete shade of gray, each of which may be selected and varied independently of the other.

Referring to FIG. 3 there is shown the analog gray encoder 18 with a plurality of comparators 60, 61, 62 and 63, each having inputs *a* and *b*. The output signal from the camera 12 is fed through the conductor 16 and a conductor 66 to the input *a* of the comparator 60. The signal on the conductor 16 is also fed through a conductor 68 and a conductor 70 to the input *a* of the comparator 61. The signal on the conductor 68 is also fed through a conductor 72 and a conductor 74 to the input *a* of the comparator 62. The signal on the conductor 72 is also fed through a conductor 76 to the input *a* of the comparator 63. Therefore the input *a* of each of the comparators 60 through 63 is connected to the video output from the camera 12.

The input *b* to each of the comparators is connected to a potentiometer for selecting a threshold voltage. Hence, the input *b* of the comparator 60 is connected by a conductor 80 to a potentiometer 82 which is set to a threshold voltage of $E_4$, the input *b* of the comparator 61 is connected by a conductor 84 to a potentiometer 86 which is set to a threshold voltage of $E_3$, the input *b* of the comparator 62 is connected by a conductor 88 to a potentiometer 90 which is set to a threshold voltage of $E_2$, and the input *b* of the comparator 63 is connected by a conductor 92 to a potentiometer 94 which is set to a threshold voltage of $E_1$.

Figure 5:
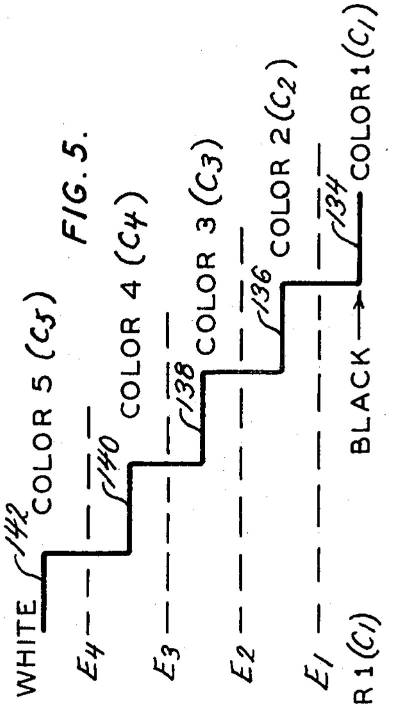
FIG. 5 is the waveform of a video signal representing a scene in discrete shades of gray as produced by the network of FIG. 3.
Figure 4:
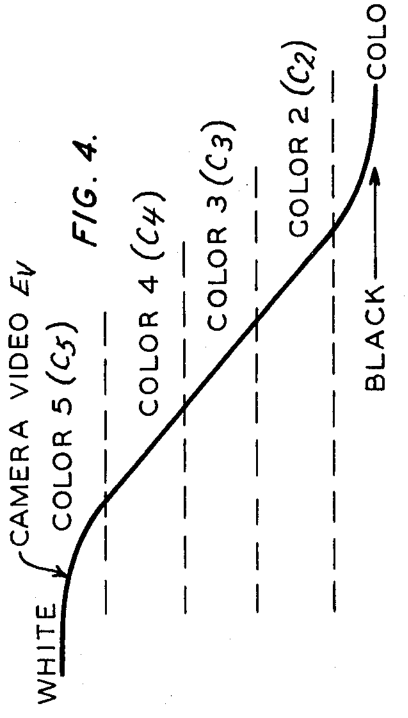
FIG. 4 is a waveform of a video signal going continuously from black to white to include all the shades of gray therebetween.

Each of the comparators 60 through 63 produces a 1 level signal at its output whenever the signal at its input *a* is greater than the signal at its input *b*. This is shown by the waveforms of FIGS. 4 and 5. The waveform of FIG. 4 represents a video signal $E_V$ from a video camera such as the camera 12, which is shown to vary from a maximum signal representing white, to a minimum signal representing black, with the portions of the waveform between the maximum and minimum points representing the infinite shades of gray therebetween. Of course, whether the video signals from the camera 12 actually include all of these shades depends on the variety of shades on the artwork 14. Reading FIG. 4 from right to left, or as the signal goes from black to white, when $E_V$ is less than the threshold voltage $E_1$, the output of the comparator 63 is a 0 level; but when $E_V$ is equal to or greater than $E_1$, the output of the comparator 63 is at a 1 level where it remains as long as $E_V$ is equal to or greater than $E_1$. The other comparators 60 through 62 operate in the same manner, so that when $E_V$ is equal to or greater than $E_2$, the output of the comparator 62 goes to a 1 level where it remains as long as $E_V$ is equal to or greater than $E_2$, when the signal $E_V$ is equal to or greater than $E_3$ the output from the comparator 61 goes to a 1 level where it remains as long as $E_V$ is equal to or greater than $E_3$, and when the signal $E_V$ is equal to or greater than $E_4$, the output of the comparator 60 goes to a 1 level where it remains as long as $E_V$ is equal to or greater than $E_4$.

The output signal from the comparator 60 is fed through a conductor 100, a resistor 102, a conductor 104, a conductor 106, and a video amplifier 108, to the output conductor 20. The output signal from the comparator 61 is fed through a conductor 110, a resistor 112, a conductor 114, the conductor 106, and the video amplifier 108, to the output conductor 20. The output signal from the comparator 62 is fed through a conductor 116, a resistor 118, a conductor 120, a conductor 122, the conductor 106, and the video amplifier 108 to the output conductor 20. The output signal from the comparator 63 is fed through a conductor 124, a resistor 126, a conductor 128, a conductor 130, the conductors 122 and 106, and the video amplifier 108, to the output conductor 120. A resistor 132 is connected between ground and the input of the video amplifier 108. The resistors 102, 112, 118 and 126 can be of equal value or can be variable to compensate for the non-linearity of the display device. The resistor 132 is of a value much less than the values of the resistors 102, 112, 118 and 126. Therefore, as shown by the circuit of FIG. 3, the outputs from the comparators 60 through 63 are fed through resistors and then connected together with the result that the signal at the input of the video amplifier 108 is directly proportional to the sum of the output signals from the comparators 60 through 63.

Referring to FIG. 5, which shows the waveform on the output conductor 20, when none of the comparators 60 through 63 are at a 1 level, the output signal on the conductor 20 is shown by the level 134; when the output of the comparator 63 is at a 1 level, the output signal on the conductor 20 is shown by the level 136; when the output signal from the comparators 62 and 63 are at a 1 level, the output signal on the conductor 20 is shown by the level 138; when the output signals from the comparators 61, 62 and 63 are at a 1 level, the output signal on the conductor 20 is shown by the level 140; and when the output signal from all of the comparators 60 through 63 are at a 1 level, the output signal on the conductor 20 is shown by the level 142 of FIG. 5. Hence, it can be seen that the analog gray encoder 18 converts a continuous video signal, such as that shown in FIG. 4, to a stairstep signal, such as that shown in FIG. 5, to define discrete levels or shades of gray.

Figure 6:
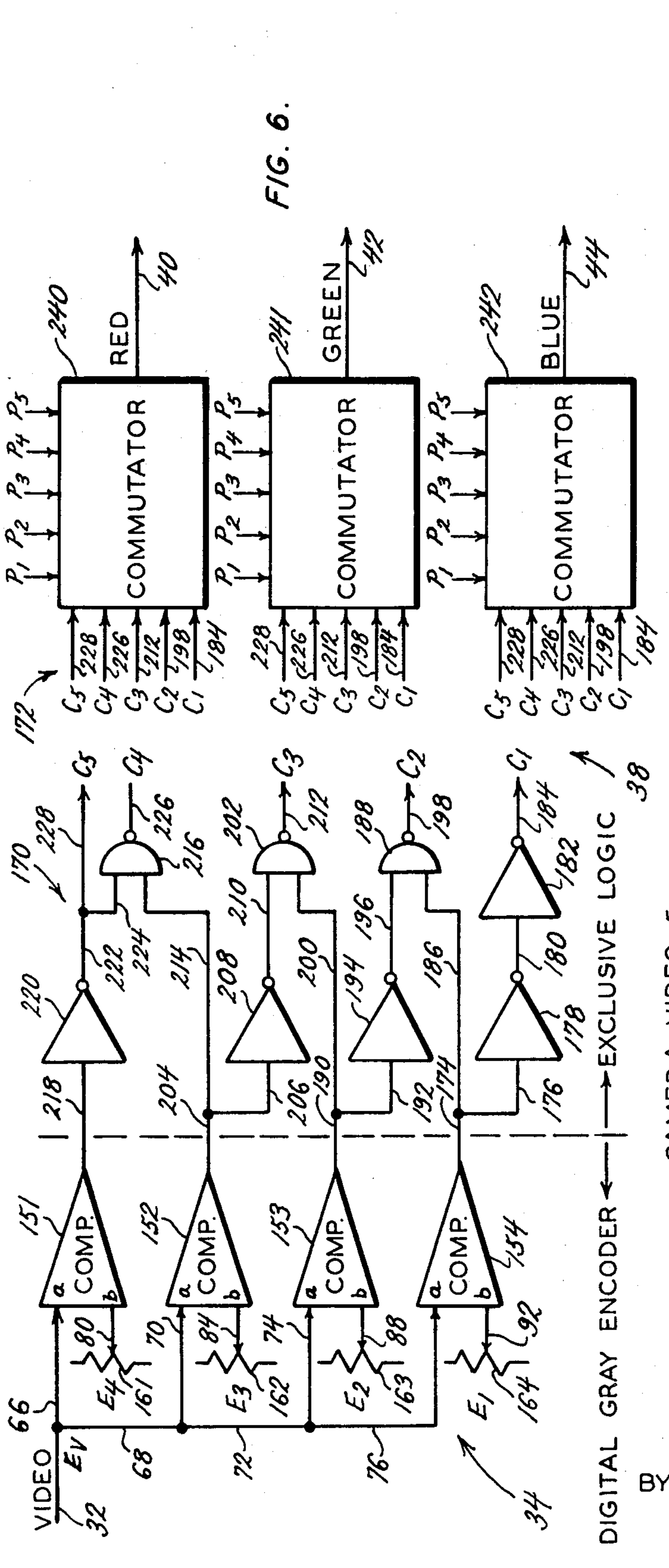
FIG. 6 is a schematic drawing of the digital encoder and the RGB color encoder of this invention.

In FIG. 6 there is shown a schematic of the digital gray encoder 34 and RGB encoder 38. The digital gray encoder 34 is similar to the analog gray encoder 18, the difference being that the outputs from the comparators are not fed through resistors and are not connected together. Hence, the digital gray encoder 34 has comparators 151 through 154 that operate in the same manner as the comparators 60 through 63 of the analog gray encoder 18, and potentiometers 161 through 164, which operate in the same manner as the potentiometers 82, 86, 90 and 94 of the analog gray encoder 18. The video signal from the video camera 28 is fed through the conductor 32 to the input *a* of each of the comparators 151 through 154, with the *b* inputs of these comparators connected to the potentiometers 161 through 164. Because signals must be generated representing the red, green and blue components of each of five colors, each of the colors being independently selective and variable, the four outputs from the comparators 151 through 154 are not connected together as is the case with the outputs from the comparators, 60 through 63, of the analog gray encoder 18, but are instead fed into the RGB color encoder 38 shown in FIG. 6.

Figures 7, 11:
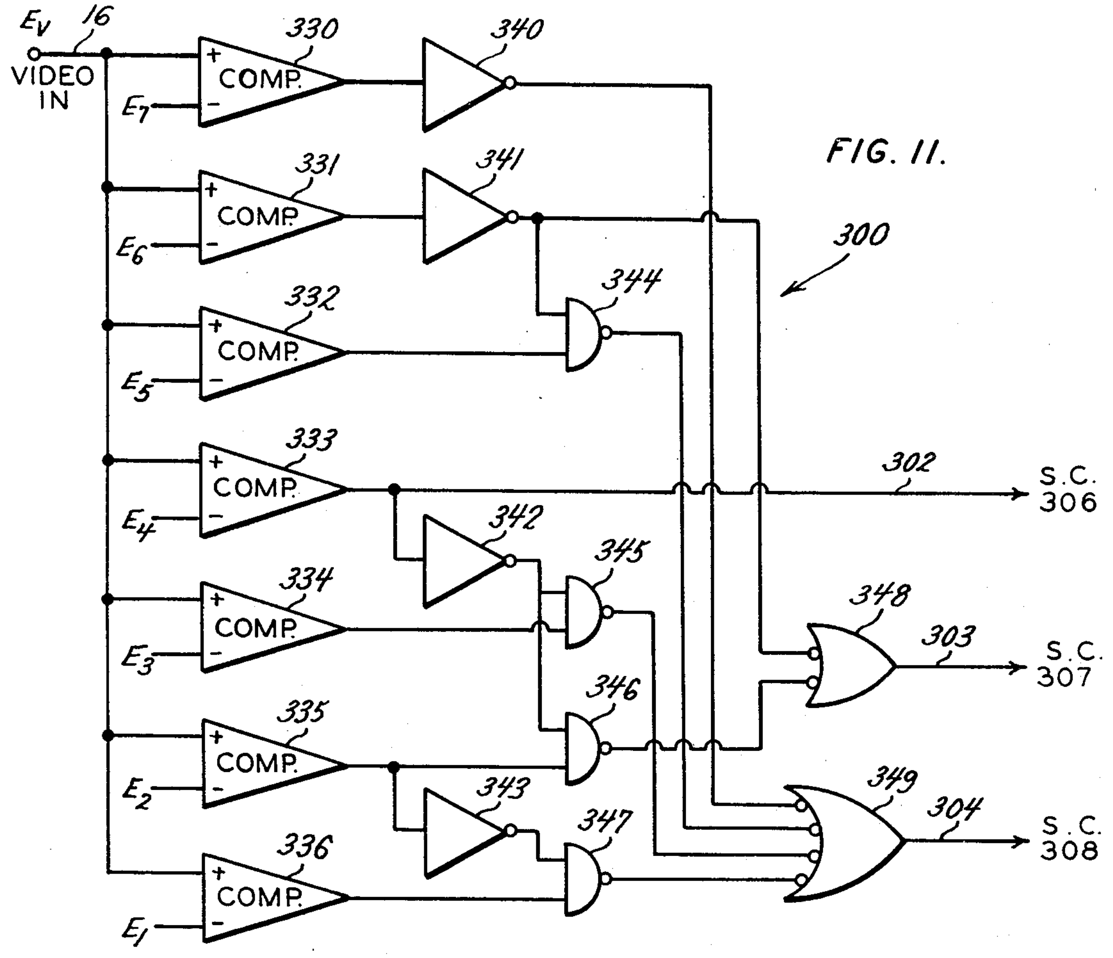
FIG. 7 is a chart used in explaining the operation of the network of FIG. 6, showing the input condition under which each of the outputs is activated.
FIG. 11 is a schematic drawing of the analog gray encoder used with the embodiment of FIG. 10.

The RGB color encoder 38 includes an exclusive logic network 170 and commutator network 172. The exclusive logic network 170 produces a single output signal corresponding to each discrete shade of gray defined by the digital gray encoder 34. In other words, only one of the outputs from the logic network 170 is enabled at any given time, that output representing one of the shades of gray. The chart of FIG. 7 shows the output activated for each input condition. The outputs are designated $C_1$ through $C_5$ to represent the five colors selected. As shown by the chart, the output $C_1$ is activated only when $E_V$ is less than $E_1$; the output $C_2$ is activated only when $E_V$ is more than $E_1$ but is less than $E_2$; the output $C_3$ is activated only when $E_V$ is more than $E_2$ but is less than $E_3$. The output $C_4$ is activated only when $E_V$ is more than $E_3$ but is less than $E_4$, and the output $C_5$ is activated only when $E_V$ is more than $E_4$, so that only one output is activated for a given value of $E_V$.

Referring to the network 170 of FIG. 6 an activated output is represented by a 0 level. The output from the comparator 154 is fed through a conductor 174, a conductor 176, an inverter 178, a conductor 180, and an inverter 182 to produce on the output conductor 184 of the inverter 182 a signal representing the color $C_1$. The signal on the conductor 174 is also fed through a conductor 186 to a first input of a NAND gate 188.

The output signal from the comparator 153 is fed through a conductor 190, a conductor 192, an inverter 194, and a conductor 196 to a second input of the NAND gate 188. The output signal from the NAND gate 188 is carried on a conductor 198 and represents the color $C_2$. The signal on the conductor 190 is also fed through a conductor 200 to a first input of a NAND gate 202.

The output signal from the comparator 152 is fed through a conductor 204, a conductor 206, an inverter 208, and a conductor 210 to the second input of the NAND gate 202. The output signal from the NAND gate 202 is carried on a conductor 212 and represents the color $C_3$. The signal on the conductor 204 is also fed through a conductor 214 to a first input of a NAND gate 216.

The output signal from the comparator 151 is fed through a conductor 218, an inverter 220, a conductor 222 and a conductor 224, to the second input of the NAND gate 216. The output from the NAND gate 216 is carried by a conductor 226 and represents the color $C_4$.

The signal on the conductor 222 is also fed through a conductor 228 to represent the color $C_5$.

The outputs $C_1$ through $C_5$ are fed through the conductors 184, 198, 212, 226, and 228 as inputs to each of three commutators 240, 241 and 242. Each of these commutators has five potentiometer inputs $P_1$ through $P_5$. Potentiometer inputs $P_1$ through $P_5$ of the commutator 240 select voltages to represent the red components of the colors $C_1$ through $C_5$, respectively, the potentiometer inputs $P_1$ through $P_5$ of the commutator 241 select voltages to represent the green components of the colors $C_1$ through $C_5$, respectively, and the potentiometer inputs $P_1$ through $P_5$ of the commutator 242 select voltages to represent the blue components of the colors $C_1$ through $C_5$, respectively. Hence, for each of the commutators 240 through 242 signals at the inputs $C_1$ through $C_5$ gate the potentiometer inputs $P_1$ through $P_5$, respectively, to the commutator output. As shown by FIG. 1 the outputs 40, 42 and 44 from the commutators are fed into the NTSC color encoder 50 to produce signals for generating the color display.

OPERATION

To operate this embodiment of the invention, the threshold levels $E_1$, $E_2$, $E_3$, and $E_4$ are set by the potentiometers 94, 90, 86, and 82 respectively, of the analog gray encoder 18 and the potentiometers 164 through 161, respectively, of the digital gray encoder 34 to produce signals representing the artwork 14 in five discrete shades of gray. Each area of the artwork 14, as defined by a discrete shade of gray, is assigned a color by setting the potentiometer inputs $P_1$ through $P_5$ of the commutators 240 through 242. Hence, the color $C_1$ for one of the discrete shades of gray is selected by setting the potentiometer input $P_1$ of each of the commutators 240 through 242 to produce on the conductors 40, 42, and 44, the red, green and blue component signals for the color $C_1$. The color $C_2$, assigned to another discrete shade of gray is selected by setting the potentiometer input $P_2$ to the commutators 240 through 242 to produce the red, green and blue component signals for the color $C_2$ on the conductors 40, 42, and 44. In like manner the potentiometer inputs $P_3$, $P_4$, and $P_5$ of the commutators 240 through 242 are set to produce the colors $C_3$, $C_4$, and $C_5$, respectively, representing the colors assigned to the other three discrete shades of gray.

As the camera 12 scans the artwork 14 video signals are produced at the output of the camera 12 to represent the artwork 14 in black and white. These signals are fed into the analog gray encoder 18 which generates signals at its output representing the artwork 14 but in only five shades of gray, the area of the artwork represented by each shade selected in accordance with the settings of the potentiometers 94, 90, 86 and 82. The scan converter 21 together with the animation signals from the animation network 22 produces signals at the output of the scan converter 21 representing an animated display of the artwork 14 in five discrete shades of gray and in standard raster sequence. These signals are fed into the digital gray encoder 34 which produces signals at its output, further defining the five gray shades as selected by the potentiometer inputs 164 through 161.

Depending upon the video information being transmitted by the scan converter 21 at a given instant of time, the video output signal $E_V$ will vary from a low signal representing dark gray or even black to a high signal representing light gray or even white. When the video signal $E_V$ at its output is less than the threshold signal $E_1$ set by the potentiometer 164, the output of the comparator 154 is a 0 level signal which is inverted twice by the inverters 178 and 182 to produce a 0 level signal at the output 184. The 0 level signal at the output of the comparator 154 is also fed to the first input of the NAND gate 188. Since the threshold voltages $E_2$, $E_3$, and $E_4$ are progressively higher than the threshold voltage $E_1$, the comparators 153, 152 and 151 likewise produce 0 level signals at their outputs. The 0 level signal at the output of the comparator 153 is fed through the inverter 194 to produce a 1 level signal at the second input of the NAND gate 188 and therefore a 1 level signal at the output 198. The 0 level signal at the output of the comparator 153 is also fed to the first input of the NAND gate 202. The 0 level output signal from the comparator 152 is fed through the inverter 208 to produce a 1 level signal at the second input of the NAND gate 202 and, therefore, a 1 level signal at the output 212. The 0 level signal at the output of the comparator 152 is also fed to the first input of the NAND gate 216. The 0 level output signal from the comparator 151 is fed through an inverter 220 to produce a 1 level signal at the second input of the NAND gate 216, and, therefore, a 1 level signal at the output 226. The 1 level signal at the output of the inverter 220 is also fed to the output 228. Therefore, when the video output signal $E_V$ is less than the threshold voltage $E_1$ as set by the potentiometer 164, the only activated output from the exclusive logic network 38 is 184 representing $C_1$, it being at a 0 level while the outputs 198, 212, 226 and 228 are at 1 levels.

When the video output signal $E_V$ from the scan converter 21 is greater than the threshold voltage $E_1$ but less than the threshold voltage $E_2$, the outputs of the comparators 153, 152 and 151 remain unchanged but the output of the comparator 154 goes from a 0 level to a 1 level. This 1 level output from the comparator 154 is twice inverted by the inverters 178 and 182 to produce a 1 level signal at the output 184. The 1 level signal at the output of the comparator 154 is also fed to the first input of the NAND gate 188. As previously described with the output of the comparator 153 at a 0 level, the second input to the NAND gate 188 is also at a 1 level to produce a 0 level signal at the output 198. Therefore, when the video output signal $E_V$ is greater than $E_1$, but less than $E_2$, only the output 198 representing the color $C_2$ is activated, it being at a 0 level, while the other outputs 184, 212, 226 and 228 are at a 1 level.

When the video output signal $E_V$ is greater than $E_2$, but less than $E_3$, the outputs of the comparators 151 and 152 remain unchanged but the output of the comparator 153 goes from a 0 level to a 1 level. The 1 level signal at the output of the comparator 153 is fed through the inverter 194 to produce a 0 level signal at the second input of the NAND gate 188 and, therefore, a 1 level signal at the output 198. The 1 level signal at the output of the comparator 153 is also fed to the first input of the NAND gate 202. With the second input of the NAND gate 202 at a 1 level as heretofore described, a 0 level signal is produced at the output 212. Therefore, when the video output signal $E_V$ is greater than the threshold voltage $E_2$ but less than the threshold voltage $E_3$, the output 212 representing the color $C_3$ is the only activated output, it being at a 0 level while the outputs 184, 198, 226 and 228 are at 1 levels.

When the video output signal $E_V$ is greater than the threshold voltage $E_3$, but less than the threshold voltage $E_4$, a 1 level signal is produced at the output of the comparator 152. The outputs of the comparators 153 and 154 remain at 1 levels, while the output of the comparator 151 remains at a 0 level. The 1 level signal at the output of the threshold detector 152 is fed through the inverter 208 to produce a 0 level signal at the second input of the NAND gate 202, and, therefore, a 1 level signal at the output 212. The 1 level output signal from the comparator 152 is also fed to the first input of the NAND gate 216. With the second input of the NAND gate 216 at a 1 level as heretofore described, the output 226 representing the color $C_4$ from the NAND gate 216 is at a 0 level. Therefore, when the video output signal $E_V$ is greater than the threshold voltage $E_3$, but less than the threshold voltage $E_4$, only the output 226 is activated, it being at a 0 level, while the outputs 184, 198, 212 and 228 are at 1 levels.

When the video output signal $E_V$ is greater than the threshold voltage $E_4$, a 1 level signal is produced at the output of the comparator 151. The outputs from the comparators 152, 153 and 154 remain at 1 levels. The 1 level output from comparator 151 is fed through the inverter 220 to produce a 0 level signal at the second input of the NAND gate 216, and, therefore, a 1 level signal at the output 226. The 0 level signal at the output of the inverter 220 is fed to the output 228 representing the color $C_5$. Therefore, when the video output signal $E_V$ is greater than $E_4$, only the output 228 is activated, it being at a 0 level while the outputs 184, 198, 212 and 226 are at 1 levels.

In this manner at any given instant of time only one of the outputs 184, 198, 212, 226 or 228 is activated, depending on the shade of gray represented by the video output information from the scan converter 21.

As a signal is received at one of the outputs 184, 198, 212, 226 or 228 from the exclusive logic network 170 corresponding to a given shade of gray, the signal is fed to the appropriate input to each of the commutators 240 through 242, to gate the corresponding potentiometer input signals through the commutators to the outputs 40, 42 and 44. These outputs represent the red, green and blue color component signals for producing the color assigned to that gray shade. Therefore, when a signal is received at the output 184, the potentiometer input $P_1$ to the commutators 240 through 242 are gated to the outputs 40, 42, and 44 to produce red, green and blue component signals for the color $C_1$. In like manner, as signals appear at the outputs 198, 212, 226 and 228, the potentiometer inputs $P_2$, $P_3$, $p_4$, and $p_5$, respectively of the commutators 240 through 242 are gated to the outputs 40, 42 and 44 to produce red, green and blue component signals for the colors $C_2$, $C_3$, $C_4$, and $C_5$, respectively. By appropriately adjusting the potentiometers $P_1$ through $P_5$ of each of the commutators 240 through 242, any color can be selectively and independently assigned to each of the five discrete shades of gray. The red, green and blue component signals at the outputs 40, 42, and 44, respectively, are then fed into the NTSC color encoder for the production of signals for transmission to the video tape or color display.

Figures 8, 12, 13:
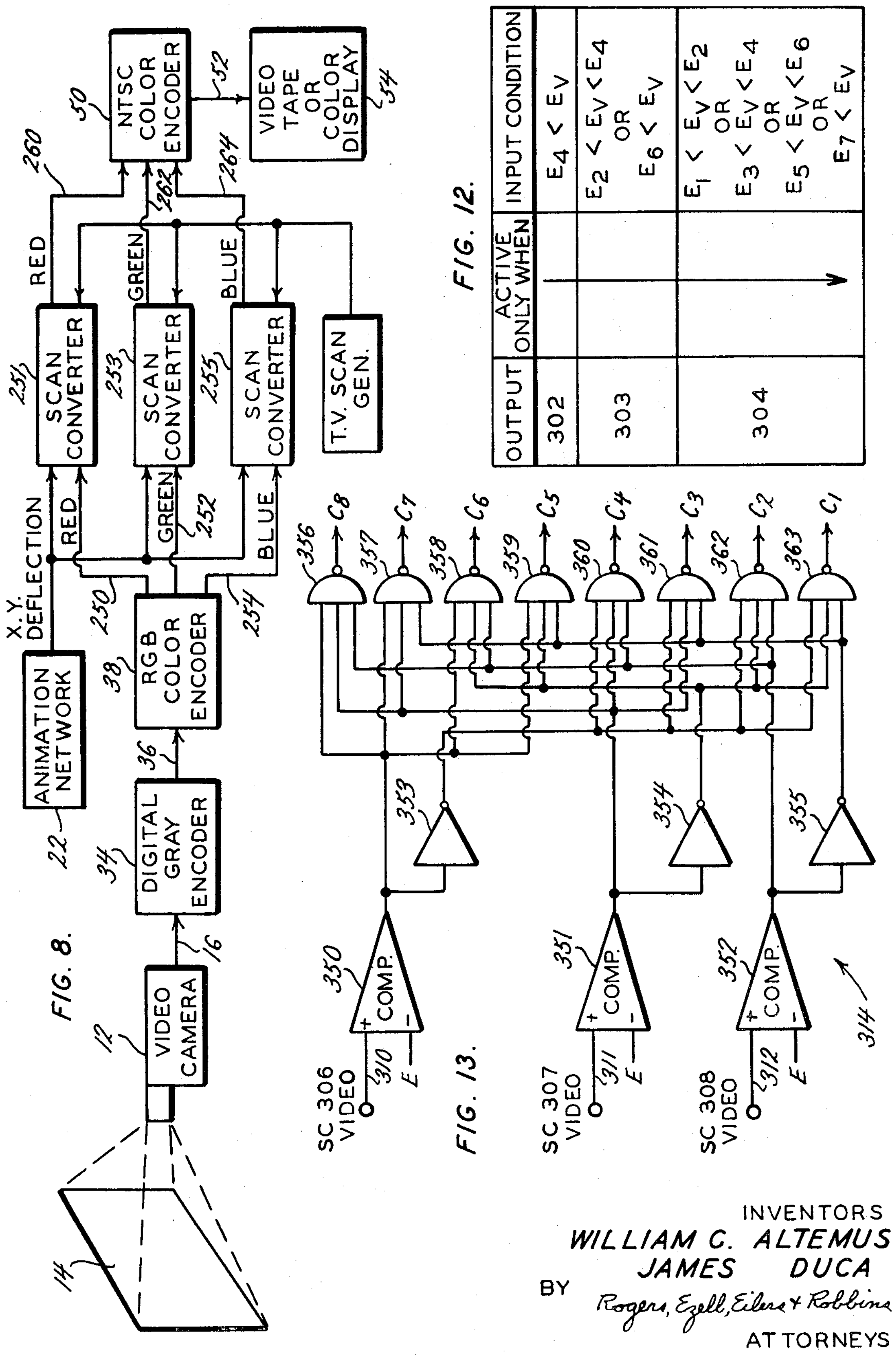
FIG. 8 is a general block diagram of the system of another embodiment of this invention.
FIG. 12 is a chart used in explaining the operation of the network of FIG. 11, showing the input condition under which each of the outputs is activated.
FIG. 13 is a schematic drawing of the digital encoder used with the embodiment of FIG. 10.

In FIG. 8 there is shown another embodiment of this invention. With this embodiment, the scan conversion is accomplished after colors are selected for each gray shade. The vodeo output signal from the video camera 12 is fed through the conductor 16 directly to the digital gray encoder 34, the output of which is fed through the conductor 36 to the color encoder 38. The video camera 12, digital gray encoder 34 and color encoder 38 operate in exactly the same manner and perform exactly the same function, as the first described embodiment.

The signals from the color encoder 38 representing the red component for each of the assigned colors are fed through a conductor 250 to the video input of a scan converter 251; the signals representing the green component of each assigned color are fed through a conductor 252 to the video input of a scan converter 253; and the signals representing the blue component of each assigned color are fed through the conductor 254 to the video input of a scan converter 255. Also, the X, Y animation signals from the animation network 22 are fed by suitable conductors to the deflection inputs of each of the scan converters 251, 253 and 255.

If it were not for the animation signals produced by the animation network 22, which signals generally produce raster distortion, the scan converters 251, 253 and 255 would be unnecessary and the outputs from the color encoder 38 could be fed directly into the NTSC color encoder for ultimate production of a color display. As it is, however, the scan converters 251, 253 and 255 are necessary to produce signals representing the animated scene in each of its color components in standard raster sequence. Therefore, the scan converter 251 produces red color component signals at its output conductor 260 representing the animated scene in standard raster sequence; the scan converter 253 produces green color component signals at its output conductor 262 representing the animated scene in standard raster sequence; and the scan converter 255 produces blue color component signals at its output conductor 264 representing the animated scene in standard raster sequence. The output signals on the conductors 260, 262 and 264 are fed into the NTSC color encoder 50, the output of which is fed through the conductor 52 to the video tape or color display 54 for ultimate production of the animated color display of the artwork 14.

By this invention not only can different areas of the artwork 14 be assigned colors, but by appropriate selection of the discrete shade of gray, these areas can be outlined in a selected color.

In FIG. 9, there is shown a relatively simple piece of artwork 280 which corresponds to the artwork 14 of FIGS. 1 and 8, having a background 282 against which is a triangular figure 284. The perimeter of the triangular figure 284 is identified by the reference numeral 286. The triangle 284 is a different shade of gray than the background 282. It makes no difference which one is darker. The artwork 280 may be represented in some animated form, depending on the mode of the animation network 22.

The potentiometer input $E_1$ of the digital gray encoder 34 is set to produce a signal at the output 184 when the beam of the camera 12 scans the area of the triangle 284. The potentiometer input $E_3$ is set to produce a signal at the output 212 when the beam of the camera 12 scans the background area 282. Because the representation of the artwork 280 produced in the scan converter is never perfect, there will be in the representation at the perimeter 286 of the triangle 284 a very narrow band of grays extending continuously from the gray shade of the triangle to the gray shade of the background. In other words, the perimeter 286 of the triangle 284 does not change instantaneously from the gray shade of the triangle to the gray shade of the background. Therefore, within this very narrow band of grays at the perimeter 286, several more discrete shades of gray can be identified with the digital gray encoder 34. Only one such additional discrete gray shade is necessary to outline the triangle 284 in only one color, this discrete gray shade lying between the gray shade of the triangle 284 and the gray shade of the background 282.

Hence, the potentiometer input $E_2$ is set to produce a signal at the output 198 whenever the beam of the camera 12 scans an infinitesimal band at the perimeter 286 of the triangle 284.

The potentiometer input $P_1$ to each of the commutators 240, 241 and 242 is set to produce a selected color for the triangle 284 when there is a signal at the output 184. In like manner the potentiometer inputs $P_3$ are set to produce a selected color for the background 282 when a signal is present at the output 212. The border is produced around the triangle 284 by setting the potentiometer inputs $P_2$ to produce a selected color whenever a signal is preset at the output 198. In this manner, the background 282, the triangle 284, and the border 286 can each be assigned any desired color by appropriately setting the potentiometers $P_1$, $P_2$, and $P_3$.

Referring to FIGS. 10 through 14, there is shown another embodiment of this invention similar to the first described embodiment but including a plurality of scan converters rather than a single such converter. The greater the number of discrete shades of gray that are defined by the system, the more difficult it is for the scan converter to differentiate between shades or levels. This is due to difficulties caused by shading or the non-uniformity of sensitivity in the scan conversion process. A better quality color reproduction is achieved by using a plurality of scan converters, each differentiating fewer levels of gray. For example, by using three scan converters a total of eight discrete shades of gray can be defined with each scan converter differentiating between only two levels, rather than five levels as in the first described embodiment.

In FIG. 10 there is shown a general block diagram of this embodiment of the invention. There is again shown the video camera 12 photographing the artwork 14. The output of the video camera 12 is fed through the conductor 16 to the input of an analog gray encoder 300, similar to the analog gray encoder 18 of the first described embodiment, but having three output conductors 302, 303 and 304, each of which is activated under certain input conditions as will be hereinafter described. The signal on the output conductor 302 is fed to the video input of a scan converter 306; the signal on the output conductor 303 is fed to the video input of a scan converter 307; and the signal on the output conductor 304 is fed to the video input of a scan converter 308. Each of the scan converters 306, 307 and 308 also have X, Y deflection inputs which are connected by suitable conductors to the X, Y deflection output of the animation network 22. Each of the scan converters 306, 307 and 308 performs basically the same function as the scan converter 21 of the first described embodiment, i.e., to convert an animated scan to a standard raster scan, except that each must differentiate only two levels of gray rather than five.

The outputs from the scan converters 306, 307 and 308 are fed through conductors 310, 311 and 312, respectively to the inputs of a digital encoded 314. The digital encoder 314 is similar to the digital encoder 34 of the first and second described embodiments except instead of heaving five outputs, each of which is activated in response to the condition at a single input, the digital encoded 314 has eight outputs, each of which is activated in response to the condition at three inputs. The eight outputs are fed through conductors 316 through 323 to an RGB color encoder 324 similar to the RGB color encoder 38 except that each commutator has eight potentiometer inputs $P_1$ through $P_8$, corresponding to eight gate inputs $C_1$ through $C_8$.

The output of the NTSC color encoder 50 is fed through the conductor 52 to the video tape or color display 54 to produce an animated representation of the artwork 14 in eight selected colors.

In FIG. 11 there is shown a schematic of the analog gray encoder 300 having a single video input into which is fed the video signal $E_V$ from the video camera 12, and three outputs 302, 303 and 304 representing inputs to the scan converters 306, 307 and 308, respectively. Included in this network are comparators 330 through 336, inverters 340 through 343, NAND gates 344 through 347, and NOR gates 348 and 349. These network components are connected as shown in FIG. 11. As the video signal $E_V$ varies from black to white, each of the outputs 302, 303 and 304 is placed in one of only two conditions, either active or inactive. The chart of FIG. 12 shows the input condition under which each of the outputs 302, 303 and 304 are active. Since each of these outputs are at only one of two levels, each of the scan converters 306, 307 and 308 must differential between only two levels.

The two-level signals from each of the scan converters 306, 307 and 308 are fed through the conductors 310, 311 and 312 to the input of the digital encoder 314 shown in FIG. 13. These scan converter outputs are fed to inputs of comparators 350, 351 and 352, respectively, each having a threshold input E. Also included in the digital encoder 314 are inverters 353, 354 and 355, and NAND gates 356 through 363. These network components are connected as shown in FIG. 13 to produce an output signal at only one of its eight outputs for each input condition.

The chart of FIG. 14 shows the input condition at the input of the digital encoder 314 under which each of the outputs is active, and further shows the input condition at the input of the analog gray encoder 300 under which each of the outputs from the digital encoder 314 is active.

The operation of this embodiment of the invention is basically the same as that of the first, except that in this embodiment a plurality of scan converters are used allowing for a reduction in the number of levels each scan converter must differentiate thereby increasing the quality of the animated color representation.

Various changes and modifications may be made within the invention as will be readily apparent to those skilled in the art. Such changes and modifications are within the scope and teaching of this invention as defined by the claims appended hereto.

What is claimed is:

1. A method of producing a color display of a scene from signals representing the scene in discrete shades of gray and with each color of the scene defined by red, green, and blue color components assigned to each discrete shade of gray comprising the steps of photographing the scene with a video camera to produce video signals representing the scene in various shades of gray, generating first signals responsive to the video signals for representing the scene in selected discrete shades of gray, generating second signals in response to the first signals, the second signals including signals to represent the red, green and blue components of a color selected for each discrete shade, and generating from the second signals a color representation of the scene.

2. The method of claim 1 wherein the color representation is a color display.

3. The method of claim 1 wherein the color representation is a video tape recording.

4. The method of claim 1 wherein only one of the first signals is generated for each discrete shade of gray.

5. The method of claim 1 including the steps of generating threshold signals for defining the discrete shades of gray, comparing the video signals with the threshold signals to generate output signals for use in producing the first signals when the video signals and threshold signals compare in predetermined correspondence.

6. The method of claim 5 including the step of combining the output signals to generate exclusive first signals for each discrete shade of gray.

7. The method of claim 6 wherein the step of generating second signals further includes the step of gating signals representing the red, green and blue components of a selected color in response to each first signal.

8. A system for producing a color display of a scene from signals representing the scene in discrete shades of gray and with each color of the scene defined by red, green, and blue color components assigned to each discrete shade of gray comprising means for producing video signals representing the scene in various shades of gray, means for generating first signals responsive to the video signals for representing the scene in selected discrete shades of gray, means for generating second signals in response to the first signals, the second signals including signals to represent the red, green and blue components of a color selected for each discrete shade, and means for generating from the second signals a color representation of the scene.

9. The system of claim 8 including a video camera for photographing the scene for producing the video signals.

10. The system of claim 8 wherein the first signal generating means includes means for generating exclusive first signals for each discrete gray shade.

11. The system of claim 8 wherein the first signal generating means includes a comparator means having video signal inputs and threshold signal inputs, the comparator means producing signals at its outputs when the signals at its video inputs compare in predetermined correspondence to the signals at its threshold inputs, means for generating a plurality of threshold signals, means for feeding the threshold signals to the threshold inputs of the comparator means, means for feeding the video signals to the video inputs of the comparator means, and means for generating the first signals from the output signals from the comparator means.

12. The system of claim 11 including exclusive logic means, the exclusive logic means generating a unique signal for each unique combination of signals at its inputs, means for feeding the output signals from the comparator means to the inputs of the exclusive logic means to produce at the output of the exclusive logic means the first signals, whereby each signal of the first signals is representative of each unique combination of signals at the inputs of the exclusive logic means.

13. The system of claim 12 wherein the threshold signals are selectively variable.

14. The system of claim 13 wherein the comparator means includes a plurality of comparators, each comparator having a video input, a threshold input, and an output, the output being activated when the video signal is greater than the threshold signal, and wherein the threshold signals are selected at various levels to produce the desired number of discrete gray shades, whereby as the level of the video signal varies a corresponding variation occurs in the number of activated comparator outputs.

15. The system of claim 14 wherein the exclusive logic means has a plurality of input corresponding to the number of outputs from the comparator means, and a plurality of outputs corresponding to the number of discrete gray shades defined, the exclusive logic means further including means for producing a signal at only one of its outputs for each combination of activated inputs.

16. The system of claim 8 wherein the second signal generating means includes means for gating signals representing the red, green and blue components of a selected color in response to each first signal.

17. The system of claim 16 including a commutator means having a plurality of gate inputs, the number of gate inputs corresponding to the number of discrete gray shades defined, for each gate input a selectively variable color signal input in each of three sets of color signal inputs, each set representing one of the red, green or blue components of the color representation, and an output corresponding to each set of color signal inputs, the commutator means being such as to simultaneously gate a color signal input in each set of inputs to the corresponding output in response to a signal at the corresponding gate input, means for feeding the first signals at gate inputs to the commutator means, and means for selecting the color signal inputs for representing the red, green and blue components of the color selected for each discrete gray shade, whereby the first signals gate corresponding color signal inputs to the outputs of the commutator means to produce the second signals.

18. A method of producing an animated color representation of a scene comprising the steps of establishing a scan pattern of a scan conversion means for producing a representation of the scene in various shades of gray, generating signals for modulating the scan pattern in accordance with a desired animation sequence, modulating the scan pattern with the modulation signals to produce an animated representation of the scene, converting the animated scan to a standard raster scan for generating first signals representing the animated scene in standard raster sequence, generating second signals responsive to the first signals for representing the scene in selected discrete shades of gray, generating third signals in response to the second signals, the third signals including signals to represent the red, green and blue components of a color selected for each discrete shade of gray, and generating from the third signals a color representation of the animated scene.

19. The method of claim 18 including the steps of photographing the scene with a first video camera to produce video signals representing the scene in various shades of gray, generating output signals responsive to the video signals for representing the scene in selected first discrete shades of gray, and producing the animated scan pattern from the output signals and the modulation signals.

20. The method of claim 19 including the steps of generating first threshold signals for defining the first discrete shades of gray, comparing the video signals with the first threshold signals to generate the output signals when the video signals and first threshold signals compare in predetermined correspondence.

21. The method of claim 18 including the steps of generating threshold signals for defining the discrete shades of gray, comparing the first signals with the threshold signals to generate output signals for use in producing the second signals when the first signals and threshold signals compare in predetermined correspondence.

22. The method of claim 21 including the step of combining the output signals to generate exclusive second signals for each discrete gray shade.

23. The method of claim 18 wherein the step of generating third signals further includes the step of gating signals representing the red, green and blue components of a selected color in response to each second signal.

24. A system for producing an animated color representation of a scene comprising a scan conversion means, means for establishing a scan pattern of the scan conversion means for producing a representation of the scene in discrete shades of gray, means for generating animation modulation signals in accordance with the desired animation sequence, means for modulating the scan pattern with the animation modulation signals to produce an animated representation of the scene, means associated with the scan conversion means for converting the animated scan to a standard raster scan for generating first signals representing the animated scene in standard raster sequence, means for generating second signals responsive to the first signals for representing the scene in selected discrete shades of gray, only one of the second signals being generated for each discrete gray shade, means for generating third signals in response to the second signals, the third signals including signals to represent the red, green and blue components of a color selected for each discrete shade of gray, and means for generating from the third signals a color representation of the animated scene.

25. A system for producing an animated color representation of a scene comprising a plurality of scan converters, means for establishing a scan pattern of each scan converter for producing a representation of the scene in selected discrete shades of gray, means for generating animation modulation signals in accordance with the desired animation sequence, means for modulating the scan pattern of each scan converter with the animation modulation signals to produce an animated representation of the scene in selected ones of the discrete gray shades, means associated with each scan converter for converting the animated scan to a standard raster scan for generating a plurality of first signals representing the animated scene in standard raster sequence and in selected ones of the discrete gray shades, means for combining the first signals to produce second signals, only one of the second signals being generated for each discrete gray shade, means for generating third signals in response to the second signals, the third signals including signals to represent the red, green and blue components of a color selected for each discrete shade of gray, and means for generating from the third signals a color representation of the animated scene.

26. A method of producing an animated color display of a scene comprising the steps of generating video signals and vertical and horizontal deflection signals for representing the scene in various shades of gray, generating first signals responsive to the video signals for representing the scene in selected discrete shades of gray, generating second signals in response to the first signals, the second signals including signals to represent the red, green and blue components of a color selected for each discrete shade, generating animation modulation signals, combining the animation modulation signals, horizontal and vertical deflection signals, and second signals to generate an animated reproduction of the scene in each of its red, green and blue color components, scanning the animated reproduction of each color component representation of the scene to generate third signals in standard raster sequence, the third signals including signals representing the animated scene in each of its red, green and blue color components, and producing an animated color display of the scene from the third signals.

27. The method of claim 26 wherein exclusive first signals are generated for each discrete shade of gray.

28. The method of claim 26 including the step of generating threshold signals for defining the discrete shades of gray, comparing the video signals with the threshold signals to generate output signals for use in producing the first signals when the video signals and threshold signals compare in predetermined correspondence.

29. The method of claim 28 including the step of combining the output signals to generate exclusive first signals for each discrete shade of gray.

30. The method of claim 29 wherein the step of generating the second signals further includes the step of gating the signals representing the red, green and blue components of a selected color in response to each first signal.

31. A system for producing an animated display of a scene comprising means for generating video signals and horizontal and vertical sweep signals to represent the scene in various shades of gray, means for generating first signals responsive to the video signals to represent the scene in discrete shades of gray, means for generating second signals responsive to the first signals, the second signals including signals representing the red, green and blue components of a color selected for each discrete gray shade, means for generating animation modulation signals in accordance with a desired animation sequence, three scan converter means, each scan converter means having a write mode and a read mode and a screen scanned by an electron beam in a scanning pattern determined by deflection inputs and in an intensity pattern determined by a video input, each scan converter means producing output signals during its read mode in relation to the scanning and intensity patterns established during its write mode, means for combining the animation modulation signals and the horizontal and vertical deflection signals, means for applying the combined signals to the deflection inputs of each of the scan converter means during the write mode, means for applying simultaneously with the application of the combined signals the video signals representing the red, green and blue color components to the video inputs of the first, second and third scan converter means, respectively, to produce scanning and intensity patterns on the screen of the scan converter means representing the animated scene in each of its red, green and blue color components, means for generating beam deflection signals for production of a standard raster scanning pattern, means for applying the beam deflection signals to the deflection inputs of the scan converter means during the read mode to generate third video signals at the outputs of the first, second and third scan converter means representing the scene in each of its red, green and blue color components, respectively, the third signals being generated in standard raster sequence, and means for producing an animated color display of the scene from the third video signals.

32. The system of claim 31 wherein the first signal generating means includes means for generating exclusive signals for each discrete gray shade.

33. The system of claim 31 wherein the first signal generating means includes a comparator means having video signal inputs and threshold signal inputs, the comparator means producing signals at its outputs when the signals at its video inputs compare in predetermined correspondence to the signals at its threshold inputs, means for generating a plurality of threshold signals, means for feeding the threshold signals to the threshold inputs of the comparator means, means for feeding the first video signals to the video inputs of the comparator means, and means for generating the first signals from the output signals from the comparator means.

34. The system of claim 33 including exclusive logic means, the exclusive logic means generating an exclusive output signal for each unique combination of signals at its inputs, means for feeding the output signals from the comparator means to the inputs of the exclusive logic means to produce at the output of the exclusive logic means the first signals, whereby each signal of the first signals is representative of each unique combination of signals at the inputs of the exclusive logic means.

35. The system of claim 34 wherein the threshold signals are selectively variable.

36. The system of claim 31 wherein the second signal generating means includes means for gating the signals representing the red, green and blue color components of a selected color in response to each first signal.

37. The system of claim 31 wherein the second signal generating means includes encoding means for generating the second signals in response to the first signals, the encoding means having variable color selection means for selecting a color to represent each discrete shade of gray.

* * * * *